Feb. 18, 1930.                W. D. DOOLEY                1,748,012
            RECTIFYING DEVICE AND METHOD OF PRODUCING THE SAME
                         Filed Sept. 12, 1928
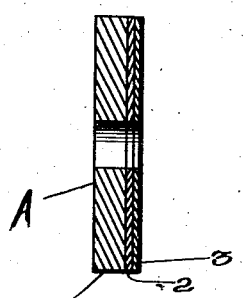
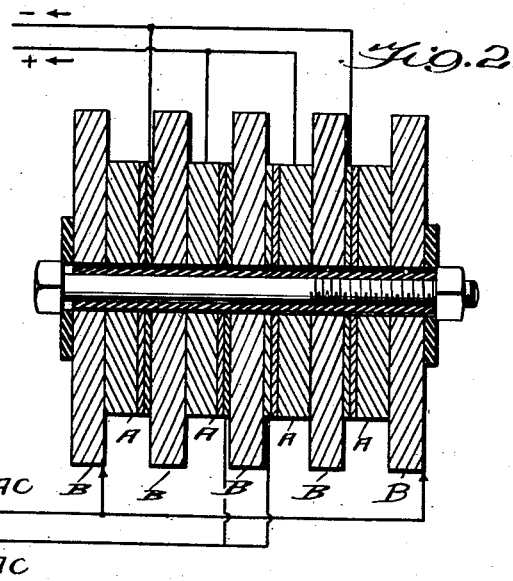
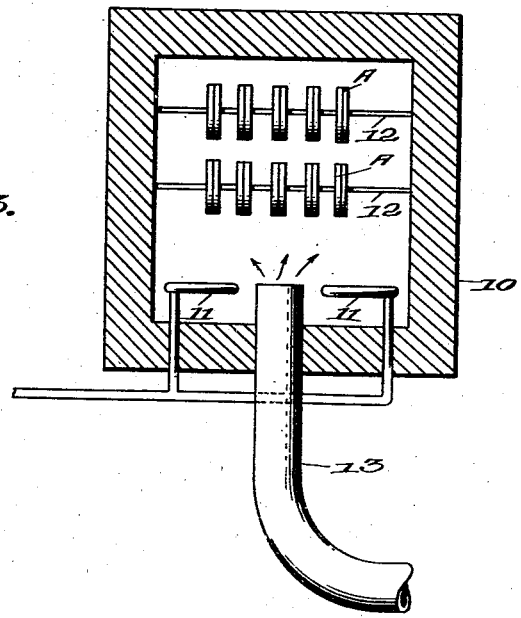
Inventor
William D. Dooley,
By [signature]
Attorneys Patented Feb. 18, 1930

1,748,012

UNITED STATES PATENT OFFICE

WILLIAM D. DOOLEY, OF WHEELING, WEST VIRGINIA

RECTIFYING DEVICE AND METHOD OF PRODUCING THE SAME

Application filed September 12, 1928. Serial No. 305,576.

The invention relates to a rectifying device and method of producing the same for converting alternating electric currents into uni-directional electric currents.

The object of the invention is to produce a dry surface-contact type of rectifier which will be efficient in its operation, simple in its construction and economical in its manufacture.

In its broad concept, the dry surface-contact rectifier of the present invention consists of a metallic plate having a plurality of layers or coatings thereon, the metallic plate being the electro-positive electrode, and the coating layers the electro-negative electrode. The metallic plate with its coatings makes up a unit or cell of the rectifier. While this rectifier may be used for any purpose where it is desirable to rectify alternating currents, it has been found to be especially useful for obtaining the voltage necessary for operating the vacuum tubes of radio apparatus from the regular alternating current house power lines.

Heretofore, devices somewhat similar in character have been used, that is, rectifiers have been constructed from metallic plates, usually copper or aluminum, with an electro-negative film consisting of the sulphate or the oxide of the metal applied to one surface of the plate. The new and novel rectifier of the present invention consists of a metallic plate which is capable of having an electrolytic film formed thereon and a layer of an oxide superimposed on the electrolytic film. When such a rectifier is used for alternating currents, the current passes from the electrolytic film and oxide coating to the metal plate, but does not flow from the plate to the coatings. Thus, an efficient dry surface type of rectifier is produced.

In the drawings:

Figure 1 illustrates a single rectifier cell or unit shown in cross-section;

Figure 2 illustrates a plurality of these rectifier cells coupled together for installation where it is necessary to convert high voltage alternating current to uni-directional current;

Figure 3 is a diagrammatic showing of an electric furnace and apparatus used in producing these rectifier cells.

In preparing the units or individual cells of this rectifier, a pure metallic plate of aluminum, bismuth, copper, magnesium, tantalum, or any other film-forming metal or amalgam of metals, is coated on one side with an electrolytic film, and thereafter a layer of metallic oxide is applied to the electrolytic film.

The following is an example of a specific embodiment of the invention.

Aluminum plates or washers of any convenient size are first dipped into a suitable chemical cleansing bath to remove grease and other surface impurities from the metal. Two plates placed back to back are put into an electrolytic or asymmetric cell of conventional design and a current of either direct or alternating current applied thereto. The plates are so positioned in the cell that they will be the anode and the conventional carbon or lead electrode the cathode. The electrolyte utilized may be any of those conventionally used, as for instance, borax solution. Upon application of an electric current to the electrodes, an electrolytic film forms on the two exposed surfaces of the aluminum plates, the thickness of which depends upon the potential of the current applied and the length of time the plates are exposed in the asymmetric cell.

After the electrolytic film has been formed on the plates, a plurality of these plates or washers, A, are placed back to back on racks 12 in an electrically heated furnace 10 to dry the plates and harden or set the films, the heat necessary for operation of the furnace being supplied by electric resistance heaters 11. After the drying is completed and the film hardened on the plates, various gases are introduced into the furnace through pipe 13, which react with the film-covered plates and form an oxide coating thereon.

During the treatment of the plates or washers in the electric furnace, it is essential that they be subjected to a temperature of from 150° to 280° C. for a period of approximately one and one-half hours. This insures the proper drying and setting or hardening of the electrolytic film.

Instead of volatilizing an aluminum compound to form the second oxide coating of the electro-negative electrode of the cell, a very thin film of aluminum foil may be placed over the electrolytic oxide film and oxidized thereon by introducing an oxidizing gas into the furnace through pipe 13. This treatment will convert the foil into an aluminum oxide and leave a very thin homogeneous oxide coating superimposed on the electrolytic film.

As indicated in Figure 1 of the drawings, A denotes a single unit or cell of the rectifier. The numeral 1 indicates the plate or washer of film-forming metal, 2 the electrolytic oxide film, and 3 the second oxide coating.

In Figure 2 a plurality of rectifier cells have been coupled together for commercial installation, the wiring indicating the input and output circuits, while the members B denote copper or other heat-dissipating fins.

The advantages of a rectifier prepared by the present invention are numerous. These rectifier cells in actual use do not become heated to any appreciable degree, and the oxide films do not break down under the small amount of heat generated by its operation. The electrolytic film formed on the metallic plate is of minute-particle size, and attaches itself to the plate with great tenacity. The second oxide coating also attaches itself to the first coating in a closely associated and homogeneous manner. Thus, a uniform oxide coating is formed which gives a large rectifying surface area. A further advantage found in this rectifier is its instantaneous rectifying action and its increased capacity for rectifying alternating currents, which is primarily due to its homogeneous and uniform oxide coatings.

What is claimed is:

1. In a dry surface-contact rectifying device, the combination of an electro-positive electrode composed of aluminum and an electro-negative electrode in contact therewith composed of an electrolytic film of an aluminum oxide, and a second aluminum oxide film positioned thereon.

2. The process of forming dry surface-contact rectifying cells, which consists in treating an aluminum plate to form an electrolytic oxide film thereon, and superimposing a second aluminum oxide film on said first oxide film.

3. The process of forming a rectifying unit which consists in treating a film-forming metal in an electrolytic cell, applying an electric current thereto to produce an electrolytic film on said metal, heat-treating said film, and coating said film with a metallic oxide.

4. The process of forming a rectifying unit which consists in treating a film-forming metal in an electrolytic cell, applying an electric current thereto to produce an electrolytic film on said metal, heat-treating said film, and coating said film with a metallic oxide of the film-forming metal.

5. The process of producing a dry rectifier cell consisting in forming an electrolytic film on an aluminum plate, drying said film, and exposing said film to the vapors of a metallic substance to form an oxide coating on said film.

6. The process of producing a dry rectifier cell consisting in forming an electrolytic film on an aluminum plate, drying said film, and exposing said film to the vapors of an aluminum compound to form an aluminum oxide coating on said film.

7. The process of producing a dry surface rectifier cell comprising forming an electrolytic oxide film on an aluminum washer, drying said film in an electro-furnace for a period of one and one-half hours at a temperature of from 150° to 280° C. to set said film, and exposing said dried film to the action of aluminum-carried vapors to form an aluminum oxide coating thereon.

8. The process of producing a dry surface rectifier cell comprising forming an electrolytic oxide film on an aluminum washer, drying said film in an electro-furnace for a period of one and one-half hours at a temperature of from 150° to 280° C. to set said film, and exposing said dried film to the action of aluminum-carried vapors to form an aluminum sulphate coating thereon, and heating said sulphate coating to drive off sulphur dioxide so that an aluminum oxide layer remains on said electrolytic film.

In testimony whereof I hereunto affix my signature.

WILLIAM D. DOOLEY.